United States Patent [19]

Weeden

[11] E Re. 28,493

[45] Reissued July 29, 1975

[54] WIRE WALL PARTITION

[75] Inventor: Robert G. Weeden, Woodbridge, Canada

[73] Assignee: Anthes Equipment Ltd., Port Credit, Canada

[22] Filed: Sept. 23, 1974

[21] Appl. No.: 508,516

Related U.S. Patent Documents

Reissue of:

[64] Patent No.: 3,734,467
Issued: May 22, 1973
Appl. No.: 144,773
Filed: May 19, 1971

[30] Foreign Application Priority Data

Sept. 10, 1970 Canada ..... 92747

[52] U.S. Cl. ..... 256/65; 256/27; 256/73
[51] Int. Cl.[2] ..... E04H 17/04
[58] Field of Search ..... 256/24, 73, 65–70, 256/25, 26; 52/753 D; 160/139, 391

[56] References Cited

UNITED STATES PATENTS

| | | | |
|---|---|---|---|
| 547,585 | 10/1895 | Lusk et al. | 52/753 D |
| 1,567,446 | 12/1925 | McClure | 160/391 |
| 1,611,078 | 12/1926 | Robson | 52/753 D |
| 1,641,523 | 9/1927 | Bell | 49/50 X |
| 1,876,486 | 9/1932 | Britten | 160/374 X |
| 2,154,599 | 4/1939 | Beckwith | 52/753 D |
| 2,323,699 | 7/1943 | Babros | 160/135 X |
| 2,855,037 | 10/1958 | Stiffel | 160/135 |
| 3,583,100 | 6/1971 | Catalano | 49/50 |
| 3,651,851 | 3/1972 | Curtis | 256/33 X |

FOREIGN PATENTS OR APPLICATIONS

| | | | |
|---|---|---|---|
| 1,121,079 | 7/1968 | United Kingdom | 256/59 |

*Primary Examiner*—Dennis L. Taylor
*Attorney, Agent, or Firm*—Anthony J. Casella

[57] ABSTRACT

A wire wall partition made up of sections and uprights. Each of the sections has a pair of upright members and a pair of horizontal members forming a generally rectangular framework. Each of the members defines a slot for receiving a [thickened] peripheral portion of a wire mesh so that the members can be slid onto the mesh and once in position, clamped in place using corner brackets. Further brackets are provided for attaching each section to the uprights which may be attached permanently to a floor and ceiling or alternatively be of a type having a compression spring to permit frictional engagement of the upright between floors of a building under construction.

2 Claims, 7 Drawing Figures

INVENTOR.
ROBERT G. WEEDEN

BY
Rogers, Bereskin & Parr

INVENTOR.
ROBERT G. WEEDEN

BY
Rogers, Bereskin & Parr

INVENTOR.
ROBERT G. WEEDEN

BY
Rogers, Berenkin & Parr

WIRE WALL PARTITION

Matter enclosed in heavy brackets [ ] appears in the original patent but forms no part of this reissue specification; matter printed in italics indicates the additions made by reissue.

---

This invention relates to a wire wall partition of a type used to surround areas of a factory floor in which stores are kept and also as a safety barrier on high rise building construction and the like.

Wire wall partitions are well known and used wherever a relatively sturdy wall is required which prevents access and yet has little effect on air movement and light distribution. The partitions are often used in factory areas to surround dangerous processes, and to prevent unauthorized access to storerooms and the like.

Previous partitions of this type consist of sections made up essentially of fabricated rectangular frames to which is welded a wire mesh screen. The units are then assembled between uprights which are attached to a floor and in some cases to a floor and the ceiling to form partitions. Such partitions are relatively expensive to manufacture because of the cost of positioning the screen on the rectangular frame and then welding each wire of the screen to the frame.

Buildings under construction often have safety rails of wood made up as required on the site and in situ. These rails are relatively expensive to make and once the wood is used to make a rail it is often scrapped upon completion of the building.

It is one of the objects of the present invention to provide sections of wire wall partitions which are relatively simple to assemble so that unskilled labour can assemble the sections. In another of its aspects, the present invention provides a wire wall partition suitable for use as a safety rail on a building under construction.

[According to a particular preferred embodiment of the present invention, a section of wire wall partition is provided. The section includes a generally rectangular frame comprising a pair of spaced-apart generally parallel upright members and a pair of longer horizontal members, the first of the horizontal members being a lower member and the second being an upper member. The members are attached where they meet by respective pairs of corner brackets which clamp the upright members to respective ends of the horizontal members. Each of the upright members and the horizontal members are generally U-shaped in cross-section terminating in co-planar, inwardly extending lips which define a slot extending longitudinally of the members. The width of the slot is slightly more than the diameter of the wires which make up the mesh. The mesh has peripheral wires extending horizontally and vertically and each of these wires is located inside a corresponding one of the members so that the mesh cannot be separated from the members.]

The invention will be better understood with reference to the drawings, wherein, FIG. 1 is a perspective view of a section of wire wall partition according to the invention;

Figure 1:
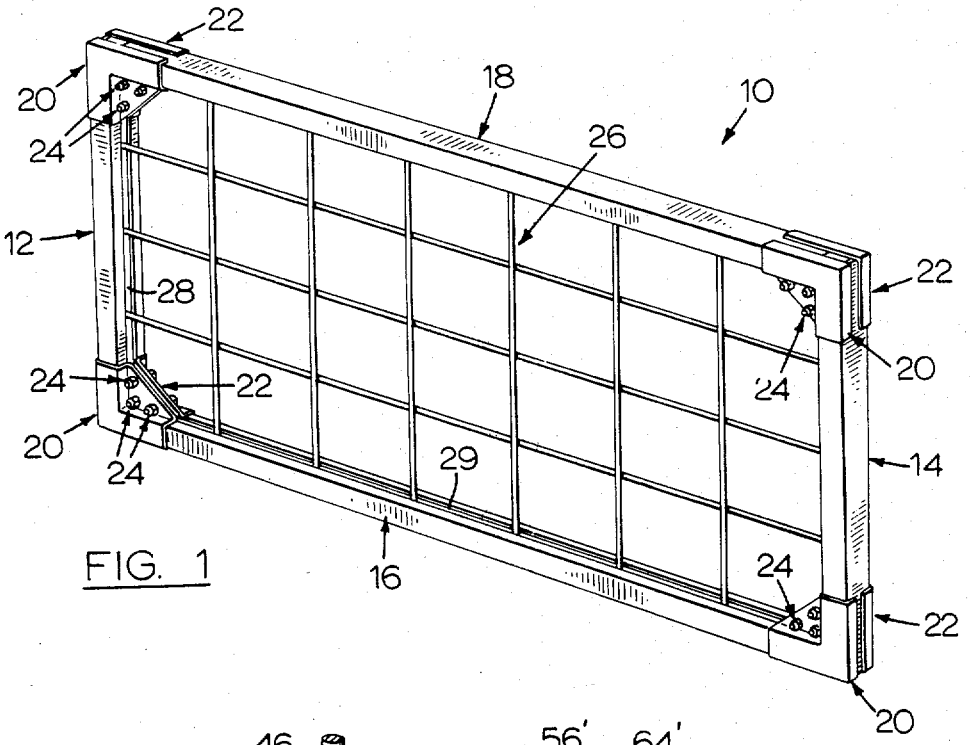

Reference is first made to FIG. 1 which shows a section 10 consisting of spaced-apart generally parallel upright members 12, 14 and horizontal members 16, 18. The members define a generally rectangular framework and are held together at the corners by respective pairs of corner brackets 20, 22 which are clamped by fasteners 24, each pair of brackets having three fasteners. A mesh or panel element 26 is engaged in slots 28 in upright member 12 and slot 29 in lower member 16 as well as in slots in the other members, these other slots being hidden in this view.

Figure 2:
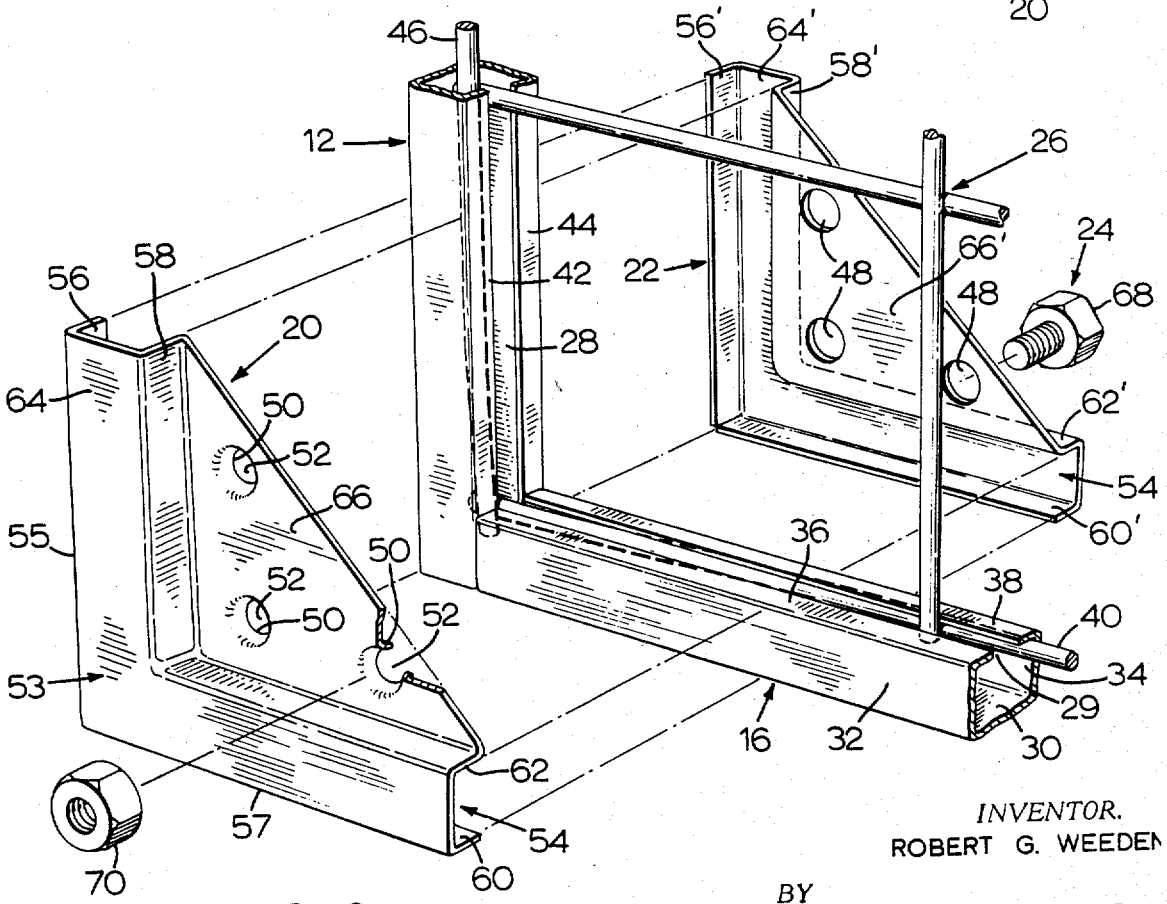
FIG. 2 is an exploded perspective view of a corner of the section.

Each of the members 12, 14, 16 and 18 are of similar cross-section and each pair of brackets 20, 22 may be assembled at any of the four corners of the framework. An exemplary corner assembly between upright member 12 and horizontal member 16 is shown in FIG. 2. The upright member 12 is as long as the height of the framework and the lower member 16 buts against the upright member 12. The cross-section of the lower member 16 is typical of all four members and is generally U-shaped. The section includes an outer wall 30, and generally parallel walls 32, 34 extending inwardly and dependent from the wall 30. Each of the walls 32, 34 terminates in one of a pair of co-planar lips 36, 38 which extend inwardly from inner edges of walls 32, 34 and terminating in edges defining the slot 29 for trapping a peripheral horizontal wire 40 of the mesh 26. Similarly lips 42, 44 are provided on upright member 12 to define slot 28 and for trapping a peripheral upright wire 46 of the mesh 26. As seen in FIG. 1 the mesh 26 consists of *a plurality of spaced-apart and parallel* upright wires laid on, *and intersecting, other spaced-apart and parallel* horizontal wires and welded in place. However, if preferred, other forms of mesh may be used consistent with having [a thickened] peripheral portion*s of a maximum thickness constituted by the combined thicknesses of the two intersecting wires at each junction* such as that formed by wires 46 and 40 (FIG. 2).

Corner bracket 22 is similar to corner bracket 20 with the exception that the bracket 22 has three generally circular openings 48 whereas the bracket 20 is deformed to define generally cylindrical upstanding lips 50 about each of the three holes 52 such that the lips 50 are location fits in respective openings 48 of bracket 22. Apart from this exception, bracket 20 is typical of both brackets 20, 22. Parts of bracket 22 which are similar to bracket 20 will be given primed numerals.

Bracket 20 is generally triangular in front view having a portion 53 defining a peripheral channel 54 in two parts 55, 57 at right angles to one another. The channel is generally U-shaped in section and the parts 55, 57 are adapted to engage relatively closely over respective end parts of members 12 and 16 adjacent the junction of these members. The channel consists of pairs of spaced-apart generally parallel walls 56, 58 and 60, 62 together with an outer wall 64. The inner extremities of walls 58, 62 of parts 55, 57 are integrally connected to a triangular shaped web 66 in which the holes 52 are formed. The bracket 20 is press formed to define the holes (or openings in the case of the bracket 22) and the peripheral channel 54. The walls 56, 60 meet at the corner between the mutually perpendicular sides of the bracket and can be welded if required to strengthen the bracket.

To assemble the framework shown in FIG. 1, the member 16 is engaged on the mesh by positioning the peripheral wire 40 (FIG. 2) inside the member 16 and then sliding the member 16 horizontally until it takes up the position shown in FIG. 1. This is repeated for the member 18 and then the member 12 is engaged with the peripheral wire 46 inside the member 12. The last member 14 is then engaged by repeating the process. Next, with the rectangular framework in a generally horizontal position, the second corner brackets 22 are engaged at the corners underneath the framework and then the brackets 20 are placed on top of the framework in engagement with respective corresponding brackets 22. Fasteners 24 (FIG. 1) are then engaged. The fasteners are typical bolts 68 which are engaged through holes 52 is brackets 20, and nuts 70 are adapted to engage on the bolts for bringing the brackets into tight engagement about the corners of the framework. Once the fasteners 24 are engaged, the wire mesh cannot escape from the framework because the peripheral wires are trapped in the members forming the framework. If preferred, the lips 50 may be made sufficiently long to allow deforming the lips outwardly once the brackets 20, 22 are in position thereby locking the brackets together.

Figure 3:
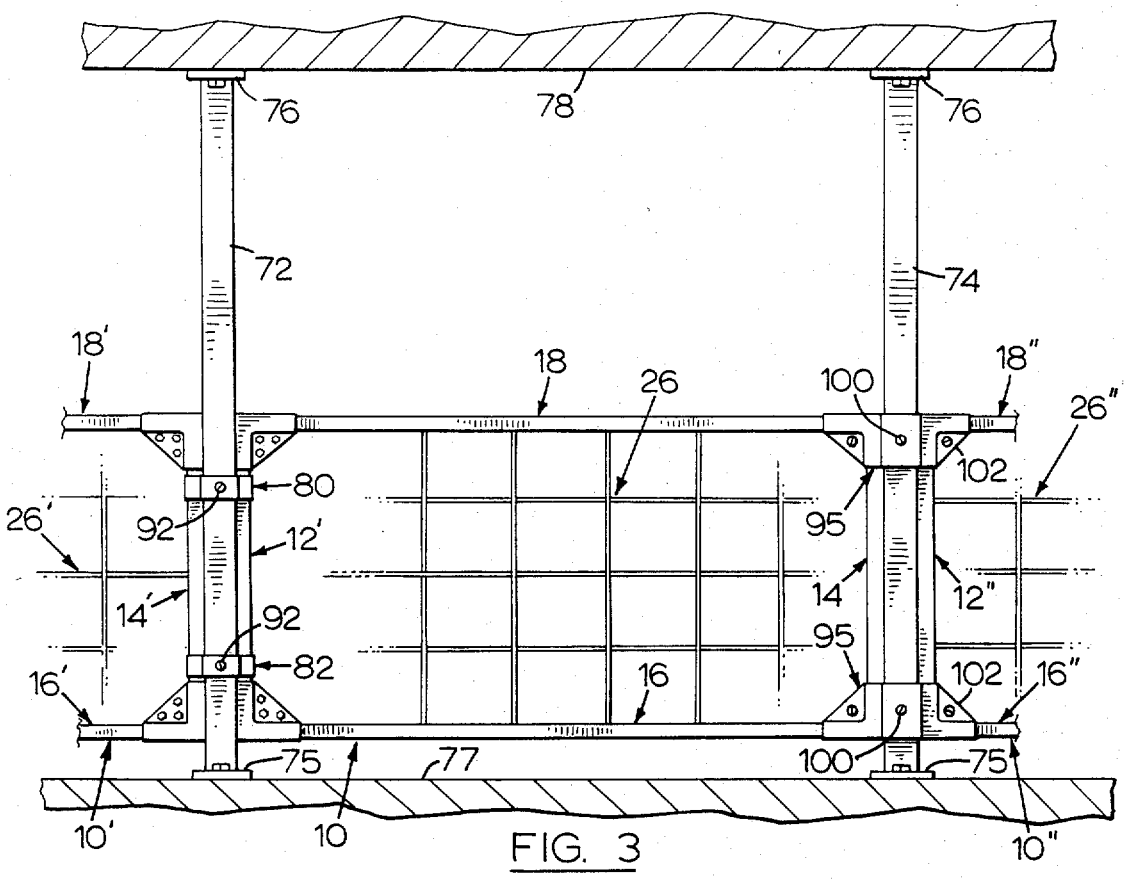
FIG. 3 is a front view of a wire wall partition according to the invention.
Figure 4:
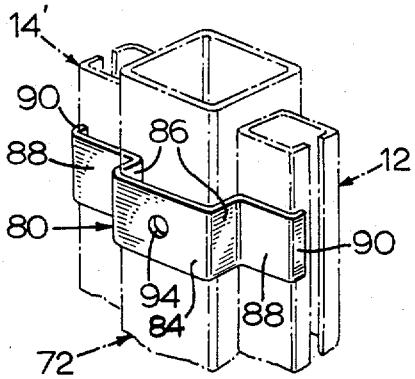
FIGS. 4 and 5 are perspective views of clips used in building the wire wall partition.

Reference is next made to FIG. 3 which shows the section 10 together with other similar sections 10′ 10″ attached to square-sectioned uprights 72, 74 which are in turn attached by brackets 75, 76 to a floor 77 and a ceiling 78. The wire wall partition so formed is typical of partitions using sections such as 10 which are attached to uprights as required. The sections can be attached by any suitable means, two of which are illustrated in FIG. 3. Upright 72 has two clips 80, 82 on each side such that the clips locate sections 10, 10′ about upright 72. The shape of clip 80, which is typical of both clips 80, 82 is best seen in FIG. 4. The clip has a generally U-shaped main portion for engaging about the upright 72 and consisting of a first portion 84 terminating in generally parallel second portions 86 which in turn terminate at co-planar, outwardly-turned third portions 88. Each of the third portions 88 terminates in a relatively short lip 90 which lips engage respective inwardly-facing sides of a corresponding member 12, 14′. A screw 92 (FIG. 3) or other suitable fastener passes through a hole 94 in the clip and is threadably engaged in the upright 72.

Figure 5:
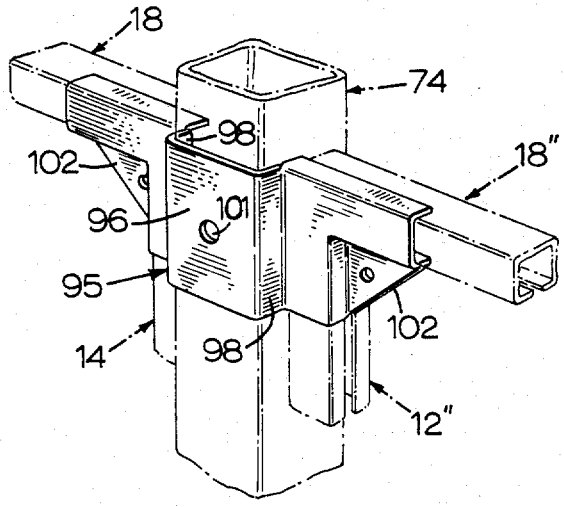

If preferred, the clips holding the sections to the uprights can be combined with the brackets used in assembling the sections. Such a clip 95 is shown in FIG. 5. Essentially the clip 95 consists of a generally U-shaped central portion having an outer wall 96 and spaced apart generally parallel walls 98 which terminate in portions similar in shape to the brackets 20 previously described. To assemble this arrangement, the clip 95 is attached to the upright 74 by a screw 100 (FIG. 3) which passes through a hole 101 in clip 95 and then corresponding parts of frameworks 10, 10″ are engaged on the clip before a similar clip is positioned on the other side of the upright to engage the members forming the sections 10, 10″ and to lock them to the upright 74. Another screw simliar to screw 100 is used to attach the second clip and then further screws are engaged between webs 102 on each of the clips to ensure that the clips lock the members forming the sections.

Figure 6:
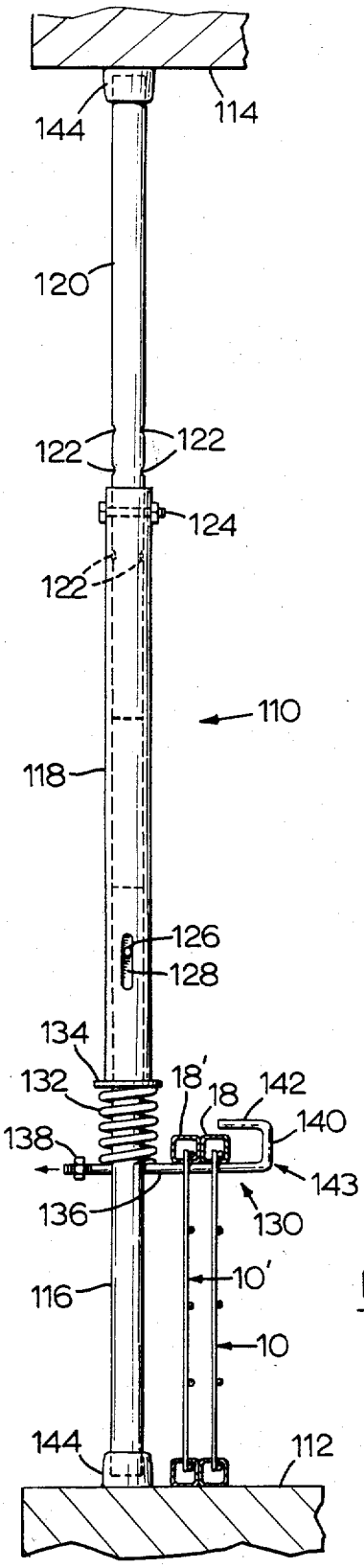
FIG. 6 is a side view of a telescopic upright.

The section 10 (FIG. 1) can also be used as a safety rail on a building in the course of construction. Reference is made to FIG. 6 which shows a spring-loaded telescopic upright 110 for engagement between floors 112, 114 of a building structure. The telescopic upright 110 consists of lower, intermediate, and upper tubular members 116, 118, and 120 arranged such that the lower and upper members are sliding fits inside the intermediate member 118. The upper member 120 has holes 122 spaced along its length for receiving a bolt 124 which passes through a selected pair of the holes 122 and through the intermediate member 118. The pair of holes 122 chosen will depend upon the distance between the floors 112, 114. The lower member 116 has a pin 126 which is a sliding fit in a slot 128 in the intermediate member 118. The pin prevents separation of the lower member 116 from the intermediate member 118 but may be omitted if preferred. The lower member 116 has pairs of diam [m] etrically opposed openings intermediate its length for slidably receiving a hook element 130 for attaching sections 10, 10′ to the upright 110. A spring 132 is adapted to apply a force on the hook element 130 to hold the element in position and also to exert outward forces on the floors 112, 114 to frictionally retain the upright 110 in position between the floors. The spring 132 bears against a washer 134 located under the intermediate member 118 for combining with a compression tool as will be described. Hook element 130 has a first portion 136 which extends through the member 118 and terminates at a first end in a nut 138 which is locked to the element 130 to prevent separation of the element from the lower member 116. The other end of the portion 136 terminates in an upright portion 140 which in turn terminates in a portion 142 extending generally parallel to the first portion 136 to define a hook 143. The distance between portions 136, 142 is such that members 18, 18′ of respective sections 10, 10′ can be engaged between the portions 136, 142 of element 130 to prevent separation of the sections 10, 10′ from the hook element. Neoprene caps 144 are provided in ends of upright 110 to increase frictional resistance for preventing accidental displacement of the uprights.

To assemble the upright 110, the spring 132 is compressed (as will be described) and the upright is positioned between floors 112, 114. The spring 132 is then released and a mallet is used to move the hook element 130 towards the right (as drawn) for receiving sections 10, 10′. The hook 143 extends inwardly to the building and the sections 10, 10′ are dropped over the hook in position on the portion 136 with slight overlap between the section 10, 10′ sufficient to permit the element 130 to pan through both sections adjacent respective upright members of the sections. Next a mallet is used to move the hook element 130 to the left as drawn to position the members 18, 18′ within the hook 143. Should an object or person fall against the sections 10, 10′, the sections are forced against the upright 110 and further outward movement is prevented.

Figure 7:
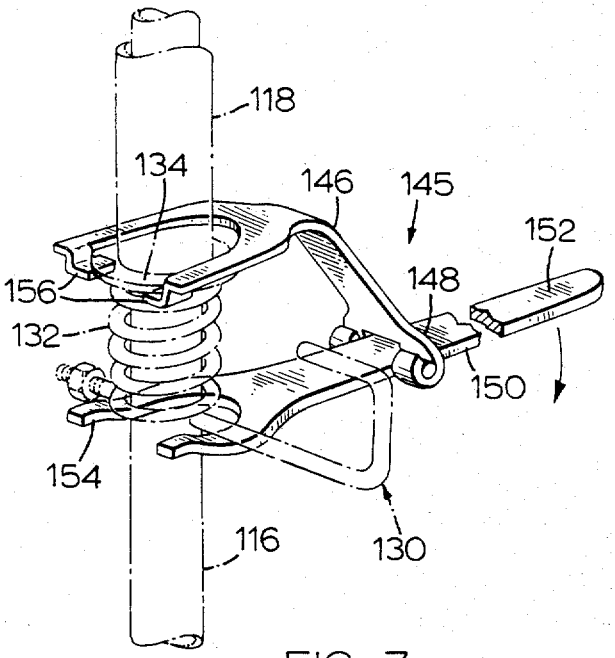
FIG. 7 is a perspective view of a tool for positioning the telescopic upright.

Reference is now made to FIG. 7 which shows a tool 144 suitable for compressing spring 132. The tool has an upper element 146 pivotally coupled at 148 to a lower element 150 intermediate the ends of element 150. The element 150 is elongated, extending from a handle end 152 to a forked end 154 adapted to engage under hook element 130. Other ends of the hooked end are curved upwardly to prevent the tool from slipping off hook element 130. The distal end of element 146 is also forked and terminates in washer engagement lug 156 for gripping washer 134.

In use, the tool 145 is engaged by slipping the lugs 156 about intermediate member 118 and dropping the element 146 downwardly and outwardly until lugs 156 are engaged about washer 134. Next forked ends of element 150 are positioned under hook element 130 and with the lower end of the upright 110 in position on the floor 112, the element 150 is gripped at 152 and pushed downwardly to compress spring 132 while simultaneously positioning the upper end of upright 110 on the underside of floor 114. The tool [144] *145* is then disengaged bearing the upright 110 in compression under the influence of spring 132. The upright 110 is disassembled by reversing the assembly procedure.

[Although the section 10 has been described as having a particular wire mesh 26, any suitable panel element can be used in place of mesh 26 provided that it has a thickened peripheral portion adjacent sides bounding the element for engaging in members such as member 12.] The shape of the element is preferably such that a figure bordering the element has straight sides.

Also the telescopic upright 110 may be in two parts if the height between floors 112, 114 is fixed. This is because upper member 120 may be dispensed with and intermediate member 118 adapted to engage the underside of the floor 114.

What I claim as my invention is:

1. A section for use in a wall partition, safety rail and the like, the section comprising:

a substantially rectangular panel element [having a thickened peripheral portion adjacent each one of its sides;] *of wire mesh comprising a plurality of spaced-apart and parallel wires intersecting other spaced-apart and parallel wires and welded in place, the peripheral portions of the panel element having a maximum thickness constituted by the combined thicknesses of the two intersecting wires at each junction;* four elongated members [adapted to support] *framing* the panel element, [each] *at least one* of the members being of substantially square cross-section having opposed spaced-apart longitudinal edges defining a slot, having a width less than the *maximum* thickness of [said thickened] *the adjacent and corresponding* peripheral portion [and sufficiently large] *of said panel element but greater than the thickness of each wire of the panel element,* to permit the member to slide longitudinally [over] *along the respective peripheral portion of* the panel element [adjacent an edge thereof and thereby enclose and entrap said thickened] *so that the said at least one member encloses and traps the corresponding* peripheral portion *of the panel element;* coupling means adapted to couple adjacent ends of the members at all four corners of the panel element in order to lock said elongated members in a rectangular form with the panel element restrained by the [thickened] peripheral portion to prevent separation of the panel element from the elongated members, said coupling means comprising four pairs of brackets and a fastener for engagement in the brackets to draw pairs of brackets together about an adjacent pair of ends of the elongated members, each bracket having a U-shaped portion defining a channel, the U-shaped portion being in two parts at right-angles to one another for receiving respective end parts of adjacent elongated members in the channel, each bracket further comprising a triangular web extending between said parts of said U-shaped portion, the web having at least one opening for receiving the fastener;

telescopic uprights having ends adapted to frictionally engage respective adjacent floors of a building and including spring means applying outward forces to increase the frictional engagement of said ends of the uprights on the floors; and attaching means adapted to attach said section to said uprights, each attaching means comprising a hook member slidably engaged in said telescopic member and frictionally locked in place by said spring means when the telescopic upright is in position between floors, said hook member being adapted to be positioned about overlapping portions of adjacent sections to hold said sections against the telescopic upright.

2. Apparatus as claimed in claim 1 in which the [panel member comprises a plurality of spaced-apart and parallel wires laid orthogonally on other spaced-apart and parallel wires and welded in place, each of the peripheral portions of the panel member being defined by the combination of a respective one of said wires and its junction with orthogonal] wires *of the wire mesh panel element intersect each other orthogonally.*

* * * * *